US006938257B1

(12) United States Patent
Rapp et al.

(10) Patent No.: US 6,938,257 B1
(45) Date of Patent: Aug. 30, 2005

(54) APPARATUS AND METHOD TO PROVIDE PERSISTENCE FOR APPLICATION INTERFACES

(75) Inventors: William Craig Rapp, Rochester, MN (US); Kristiann Joy Schultz, Wykoff, MN (US)

(73) Assignee: International Business Machines Corporation, Armonk, NY (US)

( * ) Notice: Subject to any disclaimer, the term of this patent is extended or adjusted under 35 U.S.C. 154(b) by 922 days.

(21) Appl. No.: 08/896,245

(22) Filed: Jul. 17, 1997

(51) Int. Cl.[7] ................................................ G06F 3/00
(52) U.S. Cl. ...................................... 719/311; 709/219
(58) Field of Search ................................ 709/219, 218, 709/203; 719/311

(56) References Cited

U.S. PATENT DOCUMENTS

| | | | | |
|---|---|---|---|---|
| 5,774,670 A | * | 6/1998 | Montulli | 709/227 |
| 5,796,952 A | * | 8/1998 | Davis et al. | 709/224 |
| 5,835,724 A | * | 11/1998 | Smith | 709/227 |
| 6,038,562 A | * | 3/2000 | Anjur et al. | 707/10 |

OTHER PUBLICATIONS

WebBased user's guide, changing the way the world uses the internet, Version 4.1, Jul. 1996.*
www.Fastcgi.com/devkit/doc/fastcgi–whitepaper/fastcgi.htm.*

Webmaster's professional reference, New Riders Publishing, 1996.*

* cited by examiner

*Primary Examiner*—Meng-Al T. An
*Assistant Examiner*—G. L. Opie
(74) *Attorney, Agent, or Firm*—Martin & Associates, LLC; Derek P. Martin; Roy W. Truelson (57) ABSTRACT

According to a preferred embodiment of the present invention, a persistent CGI model is used to provide a CGI program extension that captures the advantages of the presently known CGI model but overcomes many of the related disadvantages. The persistent CGI program is executed as a sub-process of the web server. The persistent CGI program receives input from web browsers through standard input and environment variables and provides output through standard output in the same manner as existing CGI programs. However, unlike existing CGI programs, the persistent CGI program is not automatically terminated after output is transmitted to the web browser by the web server application. Instead, the persistent CGI program remains active and waits for additional input from the same web browser. This allows transactions to remain open and, accordingly, state data relating to on-going transactions can be maintained in between web browser requests. Additionally, since the CGI process is persistent and maintains communication with the same web browser for multiple requests, there is no need to instantiate a separate CGI process for each subsequent request from the same web browser for the same transaction. Therefore, the persistent CGI programming model of the present invention can reduce system overhead and streamline system operation.

15 Claims, 7 Drawing Sheets

APPARATUS AND METHOD TO PROVIDE PERSISTENCE FOR APPLICATION INTERFACES

BACKGROUND OF THE INVENTION

1. Technical Field

This invention generally relates to programming interfaces for networked computer systems and more specifically relates to transactions in a client/server environment.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful that just a few years ago.

Computer systems typically include operating system software that control the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Other changes in technology have also profoundly affected how we use computers. For example, the widespread proliferation of computers prompted the development of computer networks that allow computers to communicate with each other. With the introduction of the personal computer (PC), the power and capabilities of computers became accessible to large numbers of people. Networks for personal computers were developed to allow individual users to communicate with each other. In this manner, a large number of people within a company could communicate simultaneously with a software application running on a computer system.

One computer network that has become very popular in recent years is the Internet. The Internet grew out of the modern proliferation of computers and networks, and has evolved into a sophisticated worldwide network of computer systems. One important part of the Internet is certain information displayed and linked together by web pages that collectively make up the "world-wide web" (WWW). A user at an individual PC (i.e., workstation) that wishes to access the WWW typically does so using a software application known as a web browser (also known as a client). A web browser makes a connection via the WWW to computers known as web servers, and receives information from the web servers for display on the user's workstation. Information displayed to the user is organized into pages constructed by a special language called Hypertext Markup Language (HTML).

Along with the growing popularity of the Internet, businesses have recognized that the Internet provides a new way to boost both sales and efficiency. If a potential customer can interact directly with a company's application software to purchase products and complete other similar activities, the transaction will be simplified. This increases the likelihood of customer acceptance and increases sales opportunities. While the WWW has been very successful in creating business opportunities, using the WWW as a means of conducting business over a network is not without certain difficulties.

In general, successfully conducting transactions with various software applications over the WWW requires fairly extensive knowledge of the interface requirements for the various of applications and the platforms that support these applications. It is often necessary to create an interface program that can serve as an intermediary between two other programs or process environments. One widely adopted interface standard used in the client/server environment is the Common Gateway Interface (CGI) programming model. The CGI programming model is one specific protocol or set of conventions used to provide an interface for communication and transaction support over the WWW. CGI programs are executable programs well known to those skilled in the art. Different CGI programs with different access procedures and programming interfaces are typically provided for accessing each different software application. A CGI program will extend the functionality of a web server application and, by so doing, allow a client using a web browser to access various software applications via the WWW through the CGI.

While the presently known CGI programming model has been quite successful, there are several significant limitations and a certain amount of processing restrictions that makes conducting transactions through current CGI programs somewhat cumbersome and undesirable. For example, each time a browser makes a request to a specific CGI program, a new CGI process is initiated by the web server to service that request. The request from the web browser is sent as a data stream to the CGI process and the CGI process reads the data stream and processes the request. After the CGI process has processed the web browser's request and returned the requested information to the web browser, the CGI process is terminated. Then, when the web browser makes another request, another instance of the CGI process will be initiated. This repetitive start and stop process involves a significant amount of system overhead, tending to make the communication process between the web browser and the CGI fairly inefficient.

In addition, since each web browser request results in the instantiation of a new instance of the CGI program, information that needs to be available from one web browser request to another must be maintained or stored outside of the process environment. This is typically accomplished by using relatively inefficient means such as writing the data to disk or returning the data to the web browser in a data stream from the web server. However, writing the data to disk is problematic if the web browser should terminate the pending transaction prematurely. Certain data may be stored for a future use that may never occur. This is especially true when a given web browser repeatedly submits multiple requests that are handled by the same CGI program. In addition, certain transactions which require multiple accesses to a resource by the web browser, such as database update transactions, cannot be maintained across multiple browser requests.

Finally, as the number of web users, providers, and web servers continues to rapidly expand, it will become increasingly important for a web browser to be able to reduce system overhead and interact more efficiently with CGI programs. Considering the projected proliferation of network traffic over the WWW, software applications that support the currently-known CGI program model may not have adequate system resources to support a large volume of web browser requests.

Without a CGI mechanism that is capable of providing improved methods of transaction support between software applications and web browsers on the world-wide web, transactions conducted between Internet users and software applications through CGIs will be excessively time-consuming and overly expensive. Additionally, valuable system resources may be unnecessarily expended in time-consuming overhead tasks, thereby reducing overall system efficiency.

DISCLOSURE OF INVENTION

According to a preferred embodiment of the present invention, a persistent CGI model is used to provide a CGI program extension that captures the advantages of the presently known CGI model but overcomes many of the related disadvantages. The persistent CGI program is executed as a sub-process of the web server. The persistent CGI program receives input from web browsers through standard input and environment variables and provides output through standard output in the same manner as existing CGI programs. However, unlike existing CGI programs, the persistent CGI program is not automatically terminated after output is transmitted to the web browser by the web server application. Instead, the persistent CGI program remains active and waits for additional input from the same web browser. This allows transactions to remain open and, accordingly, state data relating to on-going transactions can be maintained in between web browser requests. Additionally, since the CGI process is persistent and maintains communication with the same web browser for multiple requests, there is no need to instantiate a separate CGI process for each subsequent request from the same web browser for the same transaction.

BEST MODE FOR CARRYING OUT THE INVENTION

The present invention relates to the use of CGIs for communicating and conducting transactions via the WWW. For those individuals who are not generally familiar with WWW transactions, CGIs and their application, the Overview section below presents many of the concepts that will help to understand the preferred embodiments of the present invention. Individuals who are well versed in WWW transactions and CGI programming techniques may wish to skip the overview section and proceed directly to the detailed description section instead.

1. Overview

Web Transactions

Interactions between web browsers and web server applications create a client/server environment for conducting transactions. Various computer systems, programs, and resources are available on the WWW and can be accessed by a web browser. In order to conduct transactions with these various resources, a web browser can specify the desired resource by using a resource-specific address or identifier. These resource-specific addresses or identifiers may have many different implementations. One common identifier that is used in the WWW environment is the Uniform Resource Identifier (URI). A URI is also know as a Universal Document Identifier (UDI), Universal Resource Identifier, and a Uniform Resource Locator (URL). As far as most servers are concerned, URIs or URLs are simply formatted text strings which identify the location of a WWW resource.

Figure 2:
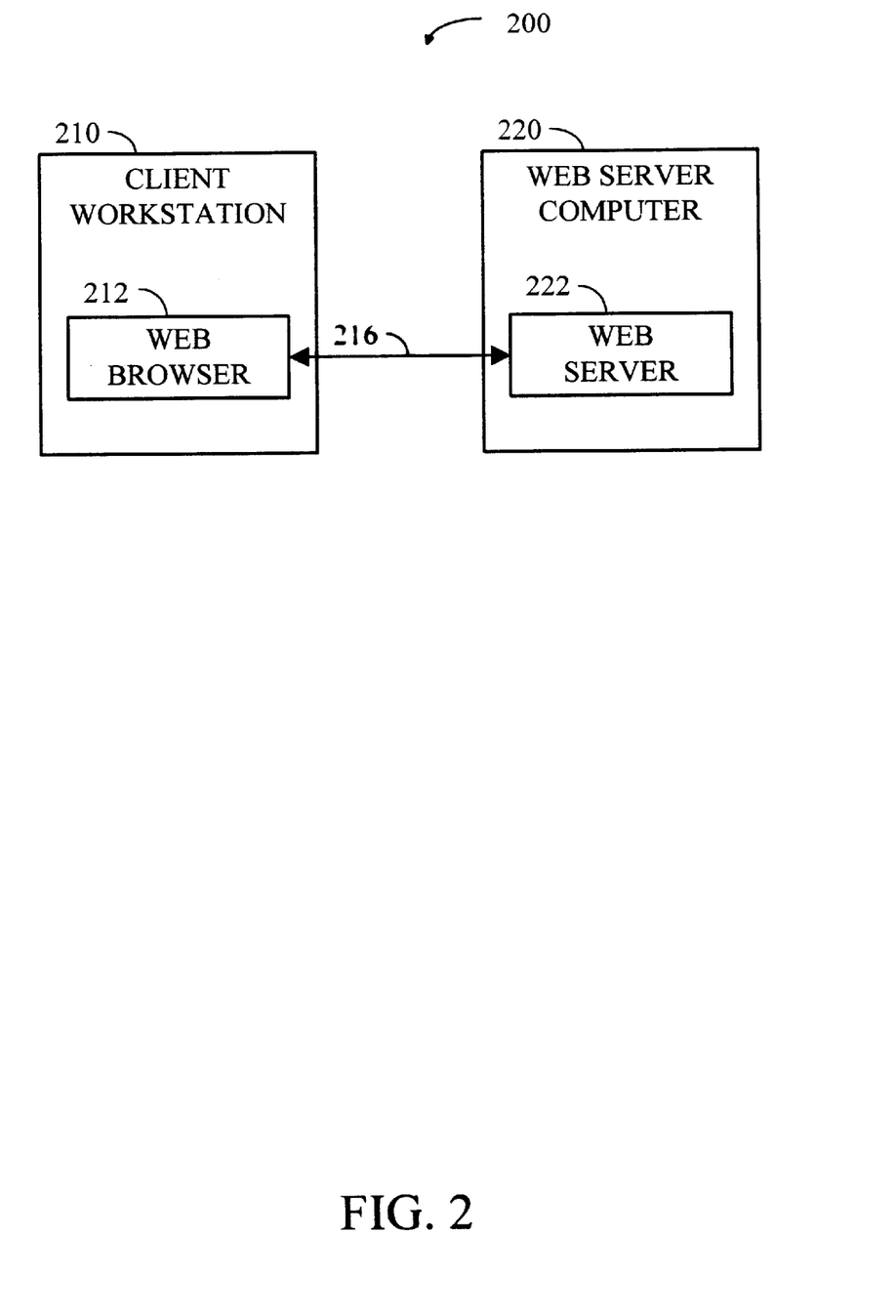
FIG. 2 is a block diagram of a WWW transaction between a client workstation and a web server.

Referring now to FIG. 2, a typical transaction between a standard web browser 212 running on a client workstation 210 and a web server application 222 running on a web server computer system 220 occurs over a connection (communication link or communication mechanism) 216. Of course, client workstation 210 may be coupled to other computer systems via a local area network (LAN) or via any other type of computer network or other interconnection. Likewise, web server computer system 220 may be coupled to other computer systems as well. Client workstation 210 may be any computer that is capable of providing access to the WWW by using web browser 212. This would include handheld, portable or laptop computers, standard desktop computer systems, dumb terminals connected to a mainframe, etc.

Web browser 212 is a software program running on client workstation 210 that allows a user at client workstation 210 to communicate with other computers over connection 216. Web browser 212 includes any web browser which is capable of transmitting and receiving data over the WWW. This includes commercial software applications such as IBM's WebExplorer, Netscape Navigator, Microsoft Internet Explorer, and any other software application which now exists or which may be developed in the future for accessing or processing information over the WWW. The preferred embodiment for connection 216 is any suitable communication link or communication mechanism which is capable of supporting a connection to the Internet or an intranet, including a hardwired connection, telephone access via a modem or high-speed T1 line, infrared or other wireless communications, computer network communications (whether over a wire or wireless), or any other suitable connection between computers, whether currently known or developed in the future.

It should be noted that client workstation 210 and web server computer system 220 may be the same physical and/or logical computer system. Web browser 212 typically displays pages of HTML data on client workstation 210. Other types of data may also be transmitted to web browser 212, including text data, graphical data (e.g., Graphic Image Format (GIF) files), audio data or sound files (e.g., WAV files), Java applets (executable code) and a specialized data form known as Multipurpose Internet Mail Extensions (MIME) data (which may include combinations of the foregoing and other data types).

Web server application 222 is a software program running on web server computer system 220 that allows a user at client workstation 210 to access information controlled by web server 220. One preferred embodiment of web server application 222 in accordance with the present invention is a commercial web server application such as IBM's Internet Connection Server. Other web server applications are also compatible with the present invention. Web server computer system 220 typically outputs pages of HTML data to web browser 212 in response to requests by web browser 212 that reflect action taken by the user at client workstation 210. In addition, as explained above, web server computer system 220 may output other types of data to web browser 212 as well. Output data may include static HTML pages (meaning that the content of the page does not vary), or may include data that must be dynamically determined and inserted into the output data. Web server application 222 may dynamically build output data (e.g., an HTML page) from parts that it retrieves from memory within web server computer system 220 or from other computer systems, or may simply pass through a page that has been constructed at an earlier time or by another computer.

Web browser 212 typically interacts with web server application 222 by transmitting input (e.g., a URI, URL or HTML page) over connection 216 to web server computer system 220. This input is typically transmitted using HyperText Transfer Protocol (HTTP). Web server computer system 220 running web server application 222 receives the input from web browser 212, and in response, outputs data (e.g., an HTML page) to browser 212. Web server computer system 220 may also have numerous other software components, including Common Gateway Interface (CGI) programs or modules, for performing desired functions. The process described above illustrates a basic transaction over the Internet, recognizing that many details and variations that are within the scope of the present invention are not disclosed herein for the purpose of providing a simple context for understanding the concepts of the present invention.

Web Pages

A web page is primarily visual data that is intended to be displayed on the monitor of client workstation 210. Web pages are generally written in HyperText Markup Language (HTML). When web server application 222 running on web server computer system 220 receives a web page request, it will build a web page in HTML or retrieve a file containing a pre-built web page and send it off across connection 216 to the requesting web browser 212. Web browser 212 understands HTML and interprets it and outputs the web page to the monitor of client workstation 210. This web page is displayed on the user's screen and may contain text, graphics, and links (which are URI or URL addresses of other web pages). These other web pages (i.e., those represented by links) may be on the same or on different web servers. The user can retrieve these other web pages by clicking on these links using a mouse or other pointing device. This entire system of web pages with links to other web pages on other servers across the world collectively comprise the "World-Wide Web" (WWW).

Multi-Threaded Environments

One way in which the performance of application software programs has been improved is by using "multi-threaded" programming concepts. In multi-threaded computer programming environments, a single application program or process will typically have multiple sub-processes, each of which can be executed as a separate "thread." This means that the application program has a number of smaller, sub-process tasks, each of which can be processed to completion independently. When a process has multiple threads, then the process is said to be a multi-threaded process. In general, there is less system-level overhead in managing a multi-threaded process as opposed to managing multiple processes to accomplish the same task. This is because, unlike independent processes, multiple threads from the same process will co-exist in the same memory space, thereby reducing memory management tasks. Thus, a certain amount of processing efficiency can be obtained by using threads in a multi-threaded operating system environment. Also, by compartmentalizing the various functions of a process into multiple threads that may be processed in parallel, independent tasks can often be completed in a more expeditious fashion.

A multi-threaded operating system will support the multi-threaded capability of a multi-threaded process and alternate the actual processing activity among several different threads in a specified sequence or, alternatively, in accordance with a priority scheme, where all threads share the same address space. Typically, these various multi-threaded processes will execute under the direction of a "server." The term "server" is commonly used to refer to a computer program, executing on an appropriate processor system or server host, that carries out service requests made by other computer programs that may be executing on the same or on other computer systems.

In many implementations, a server executes on a specified computer and receives service requests from other processes executing on other computers over a communications network. These other computer processes are typically termed "clients." Typical clients may include application software programs such as insurance company database records management programs. It is important to note that a client and a server may be operating on the same computer system or, alternatively, on geographically remote computer systems. Likewise, a single computer system may support various combinations of servers and clients.

Whenever a multi-threaded server process is initialized, a "thread pool" is typically allocated for use with the server process. This allocation process establishes a certain number of threads which are made available for use by client programs or processes. Then, whenever a client process makes a request to the server process, the number of threads required to process the request are allocated from the thread pool. The allocation, assignment, and control of the threads in the thread pool is managed by the Thread Manager. The Thread Manager will typically assign threads at random but, under certain circumstances, may provide a special dedicated thread for a particular client depending on the needs of the various client processes.

After a client request has run to completion, the thread on which the request had been processed is typically returned to the thread pool for possible use by other client processes. Such threads are termed "re-usable" threads because the same thread can be used by different client processes at different times. The purposing of re-usable threads is to reduce the system overhead incurred in creating, deleting, and otherwise managing threads. This promotes more efficient use of limited computer system resources. If, at some point in time, the demand for threads exceeds the availability of threads then, within certain limits, the Thread Manager may dynamically allocate additional threads as necessary.

In addition, most server processes take advantage of both operating system threads and thread pool threads. One main difference between operating system threads and threads from the thread pool is that operating system threads are one-time use threads and, therefore, once the sub-task executing on a operating system thread is completed, the operating system thread is terminated. However, as described above, thread pool threads can be saved by a Thread Manager and re-used for other client processes.

Standard CGI

Figure 3:
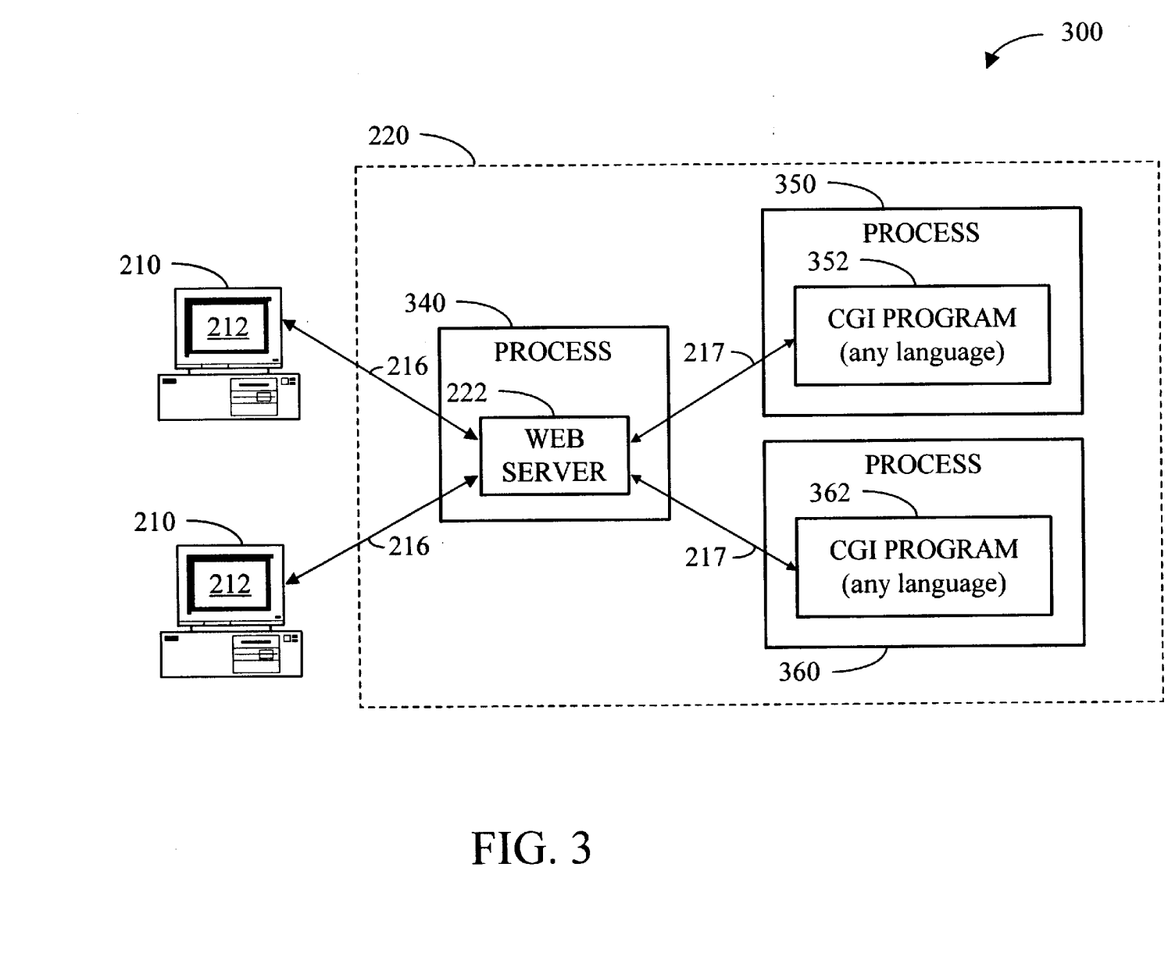
FIG. 3 is a block diagram of a known CGI-based computer system for conducting WWW transactions.

Referring now to FIG. 3, a typical CGI-based computer system 300 for conducting WWW transactions includes: client workstations 210; a web server computer system 220; connections 216; CGI interfaces 217; web server application 222; web server processes 340, CGI processes 350 and 360; CGI programs 352 and 362.

As explained earlier, the standard CGI programming model provides a method for communicating and conducting transactions over a network such as the WWW. The purpose of CGI programs 352 or 362 is to provide a web browser user the ability to resources that the user may need to accomplish the desired purpose. In addition, the user may use web browser 212 to pass variable information to CGI program 352 or 362 for processing.

On the server side, CGI interface 217 for CGI program 352 and 362 describes how CGI programs 352 and 362 are started by web server application 222 and how parameters for CGI program 352 and 362 are passed using a combination of standard input and environment variables. Environment variables are informational items that can be set and accessed by a process. Examples of environment variables include lists of library files, defaults, and other system level parameters. Most web server application programs have extended the list of environment variables used with the CGI programming model to include web browser and web server information. CGI interface 217 also describes how output information, typically HTML elements, are passed back to web server 222 using standard output procedures.

CGI programs 352 and 362 will communicate with web server application 222 via CGI headers. The use of CGI headers are well known to those skilled in the art. Typically, web browser 212 generates a request and transmits it to web server application 222. Web server application 222 will recognize that the browser request requires a CGI process and will forward the browser request to CGI programs 352 or 362. CGI programs 352 or 362 will respond to web server application 222 via headers. The three standard CGI headers are: "location" header; "status" header; and "content type" header. The location header is a message from a CGI program that redirects the web browser request to some other resource. The status header is used by the CGI to indicate an exception or error has occurred in processing the web browser request. The content type header is used by CGI program 352 or 362 to identify the type of data being returned in response to the web browser request and also to transmit the actual requested information. These three header files are supported by all web servers that are compliant with the CGI model.

The CGI programming model provides several advantages that have made it a popular choice for most WWW communications and transactions. First, the CGI programming model is relatively simple and therefore, it is easy to understand and use. Second, the CGI programming model is programming language independent. This means that a CGI interface can be created using any standard programming language. Additionally, the CGI programming model provides process isolation since CGI programs are run in processes that are separate from the HTTP server process. If an error causes one of the processes to abort, the other process may continue uninterrupted. Since the processes are isolated, there is greater stability for each process.

On the downside, the CGI program will instantiate a new process for each and every request received from web browser 212. This can be very demanding for web server application 222 and, if enough web browser requests are received, the performance of web server computer system 220 can become unacceptable. In addition, it is very difficult to accomplish most tasks with a single request to the CGI process and no information is retained by the CGI process between browser requests. The communication link established between the web browser and the CGI process is termed a "continuous link" in that, unless unexpectedly aborted, the communication link exists continuously until the web browser has received some notification or information from the CGI process via the web server. However, as previously explained, after the CGI process has filled the request, the CGI process is terminated. Although some methods have been adopted to work around this limitation, all presently-known methods are cumbersome and add more resource-consuming overhead to the process, further degrading performance.

Server APIs

Figure 4:
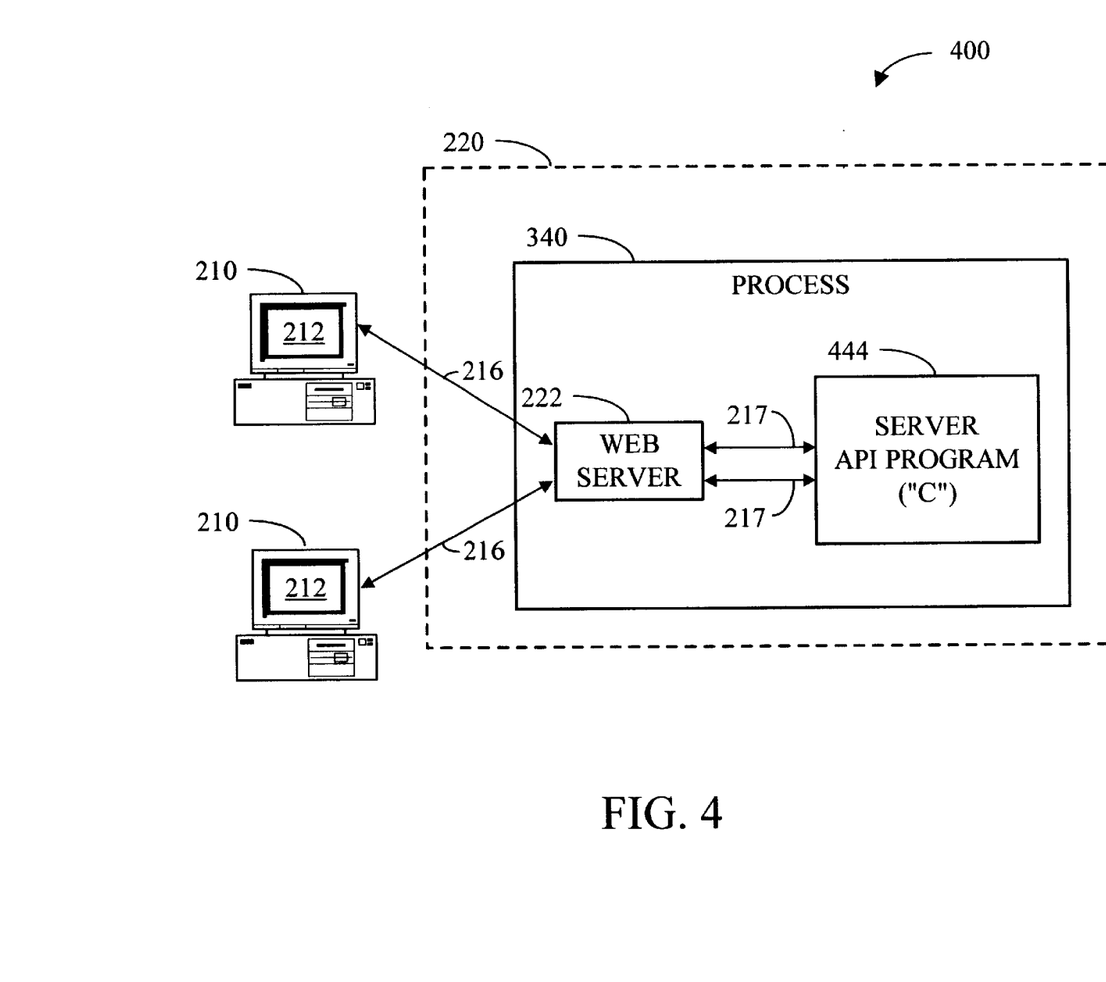
FIG. 4 is a block diagram of a known Server API-based computer system for conducting WWW transactions.

Referring now to FIG. 4, a server API-based computer system 400 for conducting WWW transactions includes: client workstations 210; a web server computer system 220; connections 216; server APIs 217; web server application 222; web server process 340; and a server API Program 444.

The use of server Application Programming Interfaces (APIs) provides another method for communicating over a network such as the WWW. Generally, APIs define a communication protocol for communicating between two or more different programs. Server APIs have been developed for use with web servers and were designed specifically to address the performance limitations of the CGI programming model. Examples of server API programs include IBM's ICAPI, Netscape's NSAPI, and Microsoft's ISAPI. Not all of these products are interchangeable and different sets of API instructions support different functions. These various products are all different implementations that have been adopted by the respective vendors for use in the WWW client/browser environment.

These server API programs extend the functionality of web server application 222 and provide an alternative to the CGI programming model. Web server application 222 and server API program 444 use server API 217 to communicate with each other. Server API program 444 is implemented as an extension to web server process 340 and is instantiated along with web server process 340. Server API program 444 will remain active as long as web server process 340 is active. Since server API program 444 runs as part of server process 340, server API program 444 has access to the server environment and can participate in various aspects of server logic such as authentication, authorization, and output generation. Server API program 444 is persistent and, therefore, can maintain state information in between subsequent requests received from client workstations 210.

The downside to implementing server API program 444 in a web browser environment can be significant. First of all, since web server program 222 and server API program 444 both share the same program environment, both programs lose some measure of security and integrity. Since both programs are part of the same program environment, if one of the programs is disabled, both programs may become inoperative. Secondly, server API program 444 must be written in the "C" programming language and will typically have multiple entry points which makes server API program 444 more complex than traditional CGI programs. Additionally, transaction capability in this environment is still limited, which forces server API program 444 to create and manage multiple web browser sessions for each web browser 212 that makes a request to server API 444 through web server application 222. Another problem is that not all web servers 222 currently support APIs and, therefore, is not an option for some implementation environments. Finally, server API 444 has no simple method for determining the duration of each separate web browser session. This may result in server API program 444 wasting system resources by waiting for input from web browser 212 that may never arrive.

FastCGI

Figure 5:
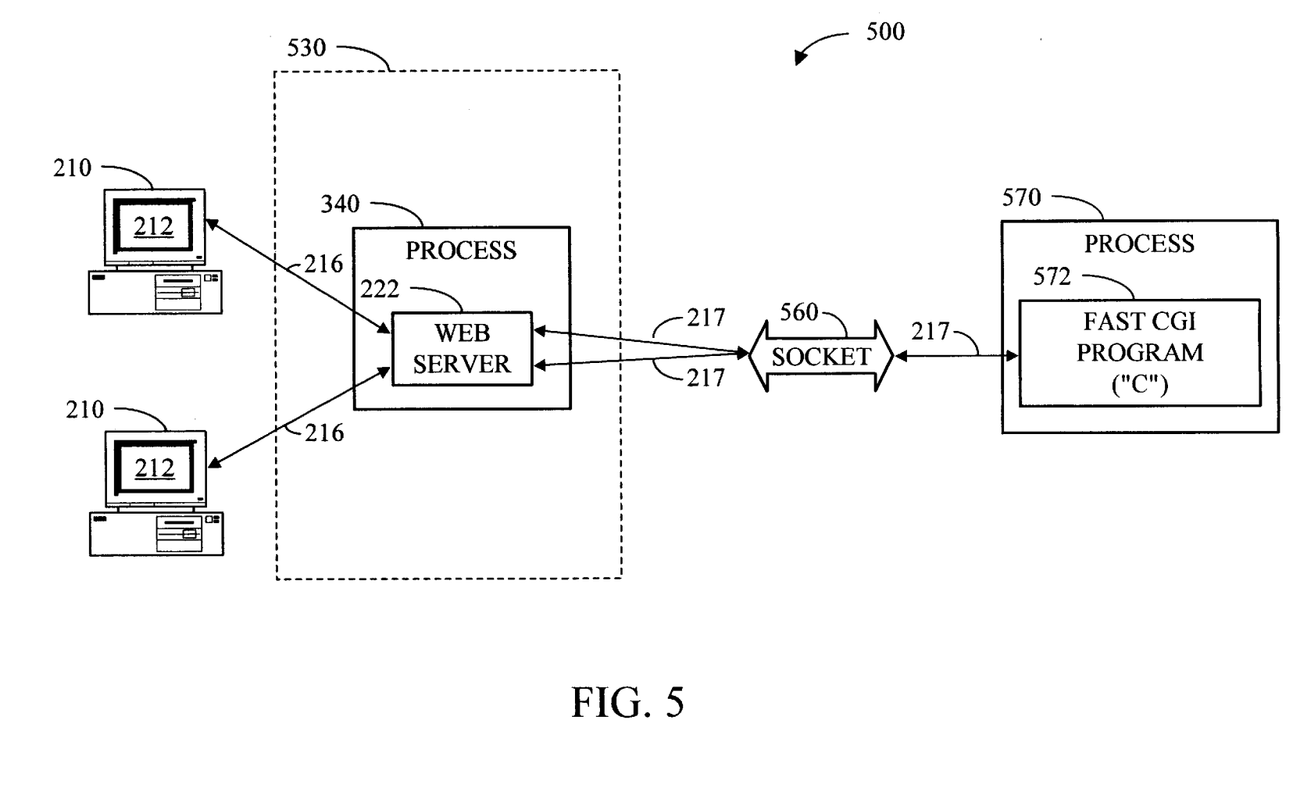
FIG. 5 is a block diagram of a known fast CGI-based computer system for conducting WWW transactions.

Another system configuration for WWW transactions is known as "Fast CGI." Referring now to FIG. 5, a FastCGI-based computer system 500 for conducting WWW transactions includes: client workstations 210; a web server computer system 530; connections 216; FastCGI interfaces 217; web server application 222; web server process 340; a socket 560; and a FastCGI Program 572.

The so-called FastCGI model is a proprietary model that provides another method for communicating with various resources over a network such as the WWW. The FastCGI process model combines features from both the standard CGI model (FIG. 3) and the server API model (FIG. 4). The FastCGI model features process isolation as explained with the standard CGI program model; however, one program services multiple requests from multiple web browsers 212 as explained in conjunction with the server API model. This means that state data for each of the various browser requests must be tracked by FastCGI program 572 and associated with the correct web browser 212 within FastCGI program 572. This requirement adds an additional layer of complexity and overhead to the system.

Socket 560 represents a full-duplex, interprocess communication between FastCGI program 572 and web server application 222. FastCGI program 572 does not use standard input and output variables for communicating between web browser 212 and process 570. Instead, FastCGI program 572 uses API calls similar to those described above to pass information to and from web server application 222. In the FastCGI model, process 570 is independent from process 340 and both processes may be running on different physical computer systems.

The downside associated with implementing the FastCGI model are many. First of all, this model is significantly more complex than the standard CGI model. Implementation of this model requires modifying and configuring web server application 222 to support the FastCGI communication model and protocols. Additionally, since the FastCGI model is proprietary, it has not yet been widely adopted and many web server applications 222 are not compatible with the FastCGI model. Finally, as with the Server API described above FastCGI program 572 is written in the "C" programming language and, therefore, is beyond the capabilities of some programmers.

2. Detailed Description

Figure 1:
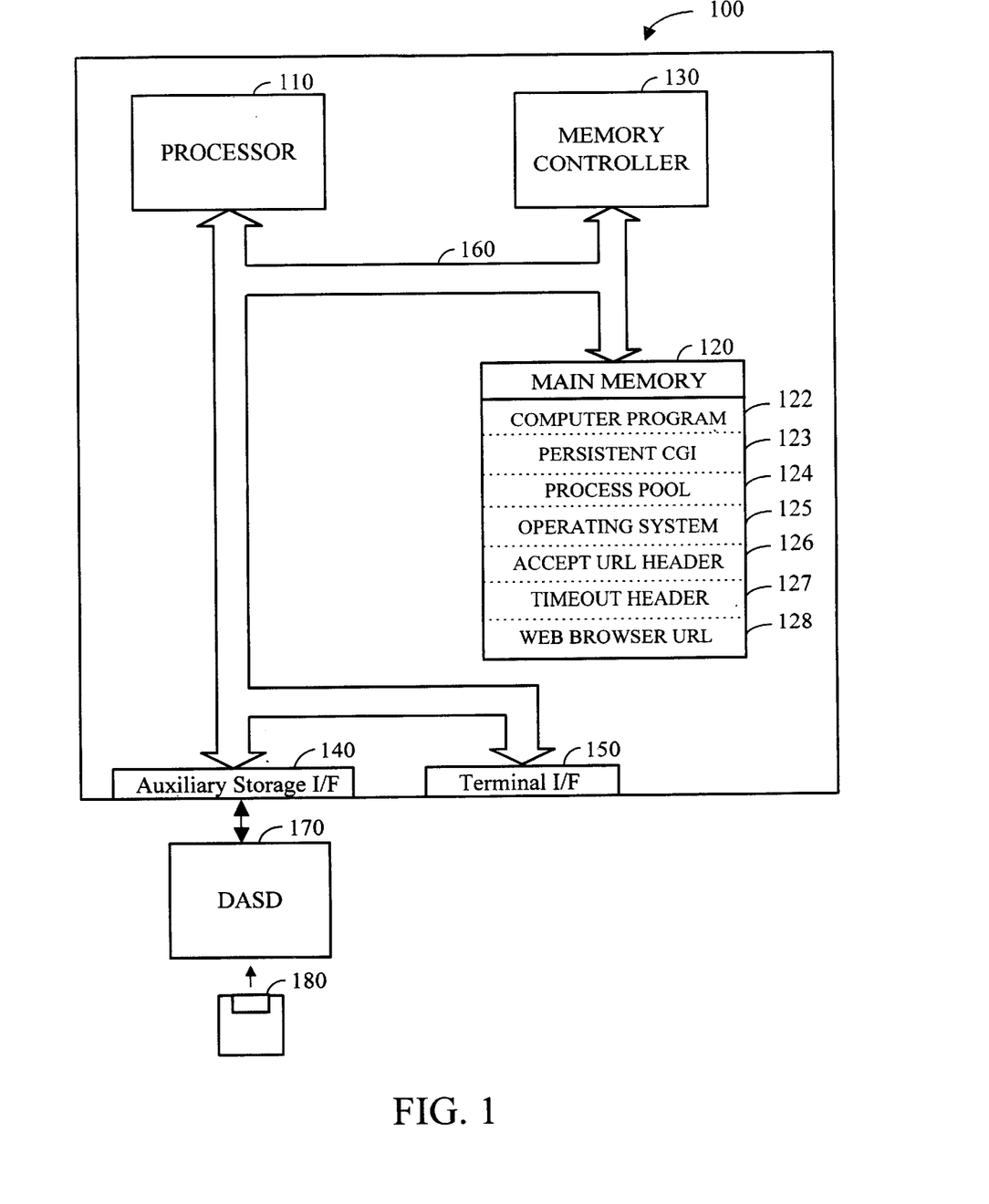
FIG. 1 is a block diagram of an apparatus according to a preferred embodiment of the present invention.

Referring now to FIG. 1, a computer system 100 in accordance with a preferred embodiment of the present invention is shown. However, those skilled in the art will appreciate that the methods and apparatus of the present invention apply equally to any computer system, regardless of whether the computer system is a complicated multi-user computing apparatus or a single user device such as a personal computer or workstation. Computer system 100 suitably comprises a Central Processing Unit (CPU) or processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes an object-oriented computer program 122 within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130 is responsible for moving requested information from main memory 120 and/or through auxiliary storage interface 140 to processor 110. While for the purposes of explanation, memory controller 130 is shown as a separate entity, those skilled in the art understand that portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication in a computer-related environment could be used.

Main memory 120 suitably contains one or more computer programs 122, a persistent CGI process 123; a process pool 124; an operating system 125; an accept URL CGI header 126; a timeout CGI header 127; and a web browser URL 128. Computer program 122 in memory 120 is used in its broadest sense, and includes any and all forms of computer programs, including source code, intermediate code, machine code, and any other representation of a computer program. Persistent CGI 123 is a program according to a preferred embodiment of the present invention which supports the features and capabilities described herein. Operating system 125 is an operating system which is capable of performing systems management tasks typical of operating systems used in computer systems generally. Process pool 124 is used in conjunction with persistent CGI 123 to control job flow for web browser requests. CGI headers 126 and 127 are extensions to the existing CGI programming model.

It should be understood that main memory 120 will not necessarily contain all parts of all mechanisms shown. For example, portions of computer program 122 and operating system 125 may be loaded into an instruction cache (not shown) for processor 110 to execute, while other files may well be stored on magnetic or optical disk storage devices (not shown). In addition, although computer program 122 is shown to reside in the same memory location as operating system 125, and object 123, it is to be understood that main memory 120 may consist of disparate memory locations. The term "memory" as used herein refers to any storage location in the virtual memory space of system 100.

Figure 6:
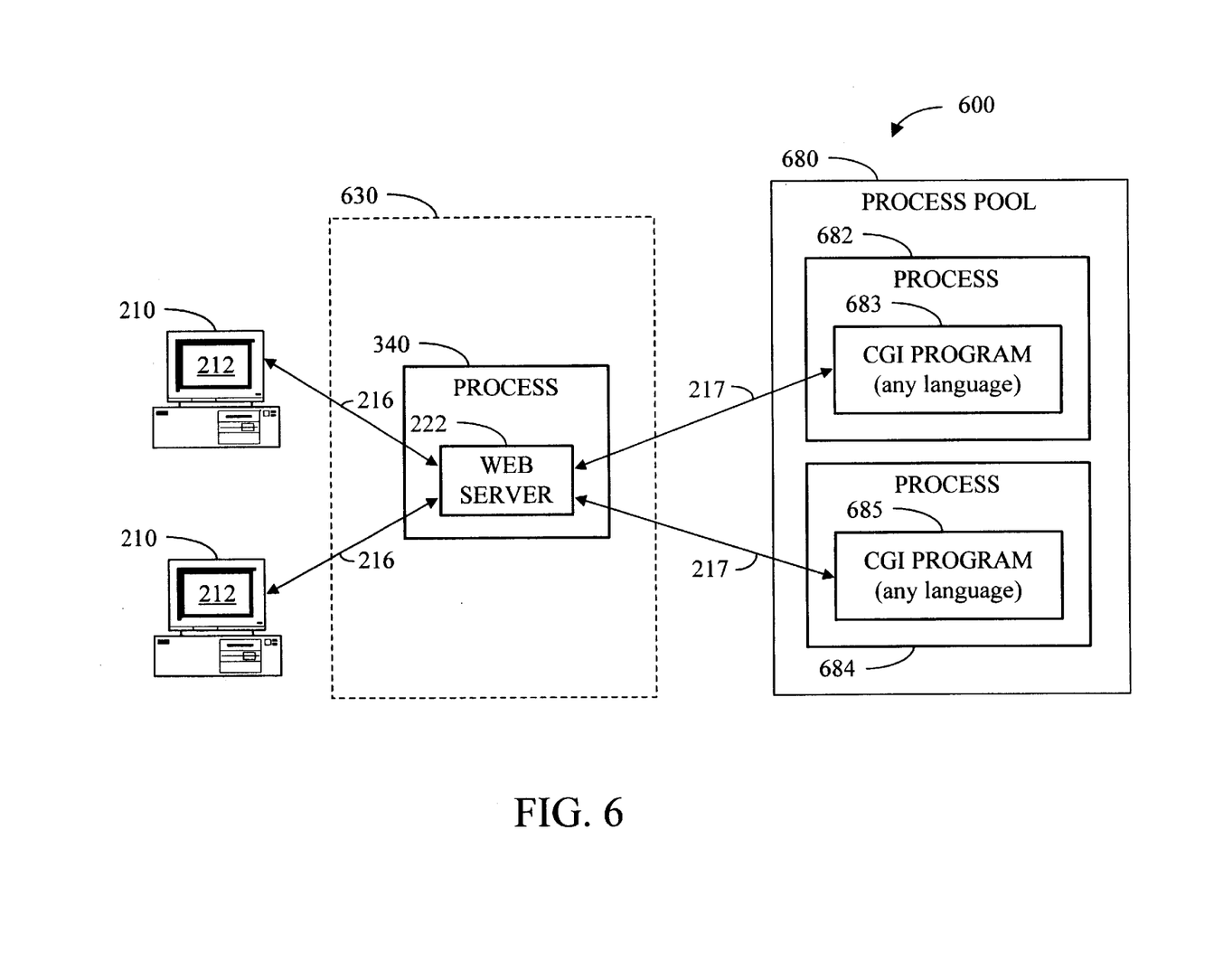
FIG. 6 is a block diagram of a persistent CGI-based system for conducting WWW transactions in accordance with a preferred embodiment of the present invention.

Referring now to FIG. 6, a persistent CGI-based computer system 600 for conducting WWW transactions in accordance with a preferred embodiment of the present invention includes: client workstations 210; a web server computer system 630; connections 216; persistent CGI interfaces 217; web server application 222; web server process 340; web server computer 630; a process pool 680, processes 682 and 684, and CGI programs 683 and 685.

In order to implement a persistent CGI model, two new CGI headers extensions are implemented. These two new headers are the "accept-URL" header and the "timeout" header. The addition of these new header files to the standard CGI programming model allows a CGI process to be persistent beyond a single web browser request and to maintain a single transaction or a series of related transactions with the same web browser 212 over an extended period of time, spanning various web browser requests.

The accept-URL CGI header is used to alert web server application 222 that CGI programs 683 and 685 will be persistent and also specifies which web browser URL 128 or web browser URLs 128 will be accepted by persistent CGI programs 683 and 685 on subsequent requests by web browser 212. The accept-URL CGI header functions as an identification mechanism to identify which subsequent browser requests will be processed by persistent CGI programs 683 and 685. Web server application 222 will not automatically terminate CGI programs 683 and 685 after a web browser request has been satisfied, but will allow CGI programs 683 and 685 to remain active, waiting for a subsequent request from web browser 212. The specified web browser URLs 128 are not provided as absolute URLs since the server may be redirecting web browser 212 to a new communication port for each subsequent access. The URLs must be unique so that web server application 222 can match web browser URL 128 with the appropriate persistent CGI program.

When web server application 222 receives an accept-URL CGI header, the web browser URLs 128 that will be accepted or recognized by persistent CGI program 683 or 685 are stored in memory 120. (i.e., as a table or linked list) and are identified as being assigned to a specific instance of persistent CGI program 683 or 685. Then, subsequent web browser requests from a web browser which match the web browser URLs 128 stored in memory 120 will be forwarded to the appropriate persistent CGI program 683 or 685 by web server application 222. This procedure effectively "dedicates" a specific instance of CGI program 683 or 685 to a specific web browser 212 for the duration of the transaction or transactions that web browser 212 wants to conduct.

The timeout CGI header is used in conjunction with the accept-URL header and functions as a timeout mechanism to specify and control the amount of time, in minutes, that the CGI program will wait for a subsequent request from a given web browser for a current job. If the timeout CGI header is not specified, the job will wait indefinitely, or until the amount of time specified by the PersistentThreadTimeout web server directive is exceeded. On the other hand, if the timeout CGI header is specified, it takes precedence over the PersistentThreadTimeout value. This option allows individual CGI programs to give users more time to respond to lengthy forms or explanations than the server may want to allow for a default value. An example demonstrating the use of the timeout CGI extension header is shown immediately below.

Timeout="Timeout" ":" minutes "." min-fragment
minutes=1*DIGIT
min-fragment=1*DIGIT The timeout value is a non-negative decimal integer, representing time in minutes. The timeout CGI extension header must be accompanied by an accept-URL CGI extension header. If not, the timeout CGI extension header will be ignored by the system. If the timeout CGI extension header is omitted, it is assumed that the CGI program is willing to wait forever for an acceptable request from the web browser. If time expires, the socket is closed and the job is ended. Additionally, an implicit rollback on the pending transaction occurs. When an instance of CGI program 683 or 685 is ended due to a timeout, a system message will be logged.

Process pool 680 may contain any number of instances of persistent CGI programs 682 and 684. Web server application 222 will typically instantiate a number of persistent CGI processes from CGI program 123 in order to accommodate requests received from web browsers 212. As requests are received, web server application 222 will forward the requests to the appropriate persistent CGI process. While persistent CGI process 682 or 684 is processing a web browser transaction it is dedicated to that specific web browser and will be unavailable to process other requests from other web browsers. After the entire web browser transaction, possibly including multiple independent requests, has been completed, persistent CGI process 682 or 684 will be terminated or returned to the process pool where it will be available to service the next request. It is important to note that the communication link established between web browser 212 and persistent CGI process 682 or 684 is "continuous" in terms of the transaction, but is "non-continuous" in terms of multiple, independent web browser requests for a single web browser 212. This enables a single transaction to encompass multiple, isolated web browser requests as a single transaction. This is in contrast to the "continuous" nature of the previously-known solutions wherein each transaction encompasses a single request and the communication link is terminated after each web browser request.

Figure 7:
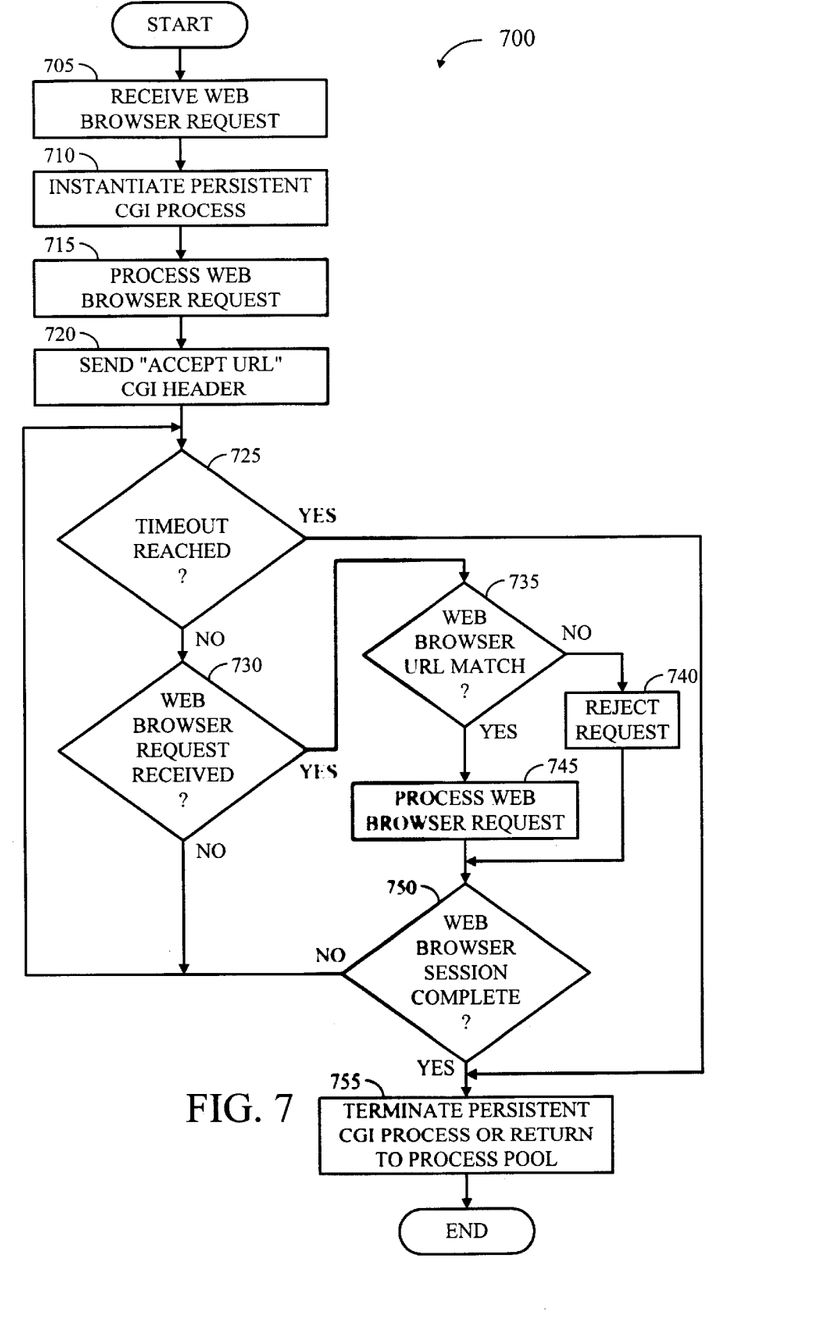
FIG. 7 is a block diagram showing a method for implementing a persistent CFI in accordance with the preferred embodiment of the present invention.

Referring now to FIGS. 1, 6, and 7, a method 700 for implementing a persistent CGI in accordance with a preferred embodiment of the present invention is shown. Web server application 222 will receive a request from web browser 212 (step 705). Web server application 222 will instantiate a persistent CGI process 123 to service the web browser request (step 710). Persistent CGI process 123 will process the web browser request and take whatever actions are necessary to satisfy the request (step 715). Persistent CGI process 123 will then send the accept URL CGI header to web server application 222 (step 720). The accept URL CGI header will serve to identify web browser 212 as the source for permissible future transactions with persistent CGI process 123. The accept URL CGI header also identifies which URLs from web browser 212 will be accepted as a match for CGI process 123.

Optionally, if the timeout CGI header is included, web server application 222 will check to see if the allocated time period has been exceeded (step 725). If so, persistent CGI process will be terminated (step 755). If the timeout CGI header is not specified or, if specified but not exceeded, persistent CGI process 123 will enter a waiting cycle, waiting for another request from web browser 212. When another request is received from a web browser (step 730=YES), web server application 222 will compare the URL of the requesting web browser against the list of URLs stored in memory (step 735) and, if it doesn't match (step 735=NO), the request will be rejected and will not be processed by persistent CGI process 123 (step 740). If, however, the URL is acceptable (step 735=YES), then persistent CGI process 123 will process the request (step 745). After the entire transaction has been completed and the web browser session is complete (step 750=YES), persistent CGI process will be terminated (step 755) or placed back into the process pool.

In addition to the CGI extension headers listed above, several new web server directives will need to be added to the standard web server directives in order to implement a persistent CGI model in accordance with a preferred embodiment of the present invention. A web server directive is a statement stored in a configuration file or files that specify the behavior of the web server. These server directives can be added, changed, or deleted via a web browser interface or by simply editing the file(s) directly. The two new server directives for use with a preferred embodiment of the present invention are the "PersistentThreadTimeout" directive and the "MaxPersistentThreads" directive.

Since there can be no certainty regarding the continuing arrival of web browser input for a given persistent CGI process, there must be a mechanism in place to clean up any loose ends associated with pending server jobs. The PersistentThreadTimeout directive is used to provide a maximum amount of time that web server application 222 will wait to receive additional browser input for a persistent CGI program before terminating the persistent CGI program. If an active thread doesn't receive any new input for the specified period of time, the job is ended or returned to the job pool. The time value specified can be any combination of hours, minutes, and seconds. If the default value of "forever" is used, the server will not end any jobs or terminate any threads. The default value can be overridden by a CGI program using the timeout CGI header explained above. The timeout CGI header allows the server administrator to set a shorter default timeout value and selectively allow individual CGI programs to specify a longer waiting time, if desired. Setting a timeout value other than "forever" prevents server jobs from being needlessly tied up due to intentional as well as unintentional "no response" conditions. When a CGI program is ended due to a timeout, a system message will be logged. An example of the use of the PersistentThreadTimeout directive is "PersistentThreadTimeout 5 mins."

The MaxPersistentThreads directive is used to specify the maximum number of threads that can be persistent at any one time. If the maximum number is reached, the server will reject any additional execution requests for new jobs until an existing persistent thread is released and becomes available for use. An example of the use of the MaxPersistentThreads directive is "MaxPersistentThreads 20."

The following example is presented to illustrate the use of a persistent CGI model in accordance with a preferred embodiment of the present invention. A company wants to provide access to a software application over the Internet that will allow employees to process customer orders. To process the customer orders, the employees will need to access several databases over the Internet. The company also plans to post an interactive product catalog on a WWW page and allow customers to access the catalog and place electronic orders over the Internet. The company also wants to accept new customers and register the customers into the company's customer database over the Internet.

When a customer accesses the company's web page, the customer will use web browser 212 to view the company's web page. Part of the web page will include a customer information data form. This form will allow the customer to enter information such as customer number, home address telephone number, etc. After the customer has entered the necessary information, the information will be transmitted to web server application 222 for processing. Web server application 222 will instantiate persistent CGI process 123 and persistent CGI process will take the necessary steps to satisfy the request. This may include opening the company's database file to check or verify the customer number, address information, etc. Persistent CGI process 123 will also send the Accept URL CGI header and requested data or response for web browser 212 to web server application 222. Web server application 222 will forward the requested data or response from persistent CGI process 123 to web browser 212 and open a port for web browser 212.

At this point in time, the customer will use web browser 212 to submit another request to web server application 222. This request may be the customer's order for a specific product from the on-line catalog. When this request is received by web server application 222, the URL that is transmitted with the request will identify web browser 212 and web server application 222 will forward the request to the port where persistent CGI process 123 is waiting. Persistent CGI process 123 will then process this request as well. In a similar fashion, additional requests from web browser 212 may include transmission of billing information, shipping data, etc. All of these requests will be routed by web server application 222 to persistent CGI process 123 and will be processed by persistent CGI process 123. Once the entire transaction has been completed, persistent CGI process 123 will return to web server application 222 and not specify the Accept URL CGI header. This will signify that persistent CGI process 123 has completed the transaction with web browser 212 (step 750) and persistent CGI process 123 can then be terminated or returned to the process pool to await a new request for a new transaction from web browser 212 or any other web browser that submits a request to web server application 222.

When implementing a persistent CGI model, such as the one depicted in FIG. 6, there are several system management-related issues that must be addressed in order to fully realize the potential benefits of the present invention. Since a persistent CGI process can remain active for potentially long periods of time, it can inadvertently monopolize certain system resources. Programming a persistent CGI process will require attention to the allocation and usage of all system resources to preserve system functionality. For example, if a persistent CGI process is not set up to "time-out" or terminate after a certain amount of time, the process may continually consume system resources waiting for the client to continue a given transaction. However, this possibility can be minimized or eliminated by using the "timeout" CGI extension header described above. In addition, portability of a persistent CGI process is somewhat reduced when compared to a standard CGI process because not all web server applications presently support the persistent CGI model. This limitation should decrease in significance as more and more HTTP servers are designed to support the persistent CGI model.

A further enhancement of the present invention includes the concept of "activation groups." Activation groups are a specific group of persistent CGI processes that are identified as a sub-pool within the process pool where the activation groups are certain processes that have been pre-initialized for a specific program or process and the necessary environment variables are also pre-initialized. Processes in an activation group may remain active over multiple browser requests. This allows a web browser that requires access to a specific program to repeatedly interact with a program in the desired activation group and accomplish the desired task in a more expedient method.

By implementing a persistent CGI process in accordance with a preferred embodiment of the present invention, the nature of the communication process between the web browser and the CGI process is quite different from the previously known solutions described above. Instead of a single web browser request being processed via a single continuous communication connection, multiple separate, yet related, requests can be processed by a series of non-continuous communication connections which are established between a given web browser and the same CGI process.

While the invention has been particularly shown and described with reference to preferred embodiments thereof, it will be understood by those skilled in the art that various changes in form and details may be made therein without departing from the spirit and scope of the invention. Particularly, while the present invention has been described within the context of the CGI programming model, it may suitably be adopted for use in other environments as well.

What is claimed is:

1. A persistent CGI apparatus, the apparatus comprising:
    at least one CPU;
    a memory coupled to the CPU;
    a persistent CGI program residing in the memory and being executed by the CPU, wherein the persistent CGI program is capable of receiving and transmitting data to and from a web browser via a non-continuous communication connection which is established between the web browser and a first instance of the persistent CGI program, said first instance of the persistent CGI program remaining active after processing a request received from the web browser, whereby said first instance of the persistent CGI program processes a plurality of discrete requests from said web browser; and
    an identification mechanism residing in the memory, the identification mechanism identifying at least one resource-specific address from the at least one web browser that will be accepted by said first instance of the persistent CGI program.

2. The apparatus of claim 1 further comprising a timeout mechanism residing in the memory, the timeout mechanism terminating said first instance of the persistent CGI program after a pre-determined period of time.

3. The apparatus of claim 1 further comprising a process pool residing in the memory, wherein said first instance of the persistent CGI program is part of the process pool.

4. The apparatus of claim 3 further comprising an activation group, wherein the activation group is part of the process pool and said first instance of the persistent CGI program is part of the activation group.

5. A method for communicating with a web browser, the method comprising the steps of:
    sending a first web browser request to a persistent CGI program from the web browser via a web server;
    processing the first web browser request in a first instance of said persistent CGI program to generate a result;
    storing a first resource-specific address that will be accepted by said first instance of the persistent CGI program from the web browser in a memory location;
    sending the result to the web browser via the web server;
    establishing a non-continuous communication link between the web browser and said first instance of the persistent CGI program;
    keeping said first instance of the persistent CGI program active after sending the result to the web browser to process subsequent requests from the web browser, whereby said first instance of the persistent CGI program processes multiple discrete requests from the browser; and
    using an identification mechanism to identify at least one resource-specific address from the web browser that will be accepted by said first instance of the persistent CGI program.

6. The method of claim 5 further comprising the step of terminating said first instance of the persistent CGI program after waiting a pre-determined amount of time.

7. The method of claim 5 wherein the step of sending a first browser request to the persistent CGI program comprises the step of sending the first browser request to a process pool where the first browser request is assigned to said first instance of the persistent CGI program.

8. The method of claim 7 further comprising the step of pre-initializing the persistent CGI program in the process pool to create an activation group.

9. A program product comprising:
    (A) a persistent CGI program, wherein a first instance of the persistent CGI program receives data from and transmits data to a single web browser via a non-continuous communication connection which is maintained between the persistent interface program and the single web browser over a series of multiple web browser requests from the web single browser by using an identification mechanism to identify the single web browser and wherein said first instance of the persistent CGI program remains active while waiting for each web browser request, whereby said first instance of the persistent CGI program processes a plurality of discrete requests from said single web browser; and
    (B) signal bearing media bearing the persistent CGI program.

10. The program product of claim 9 wherein the signal bearing media comprises recordable media.

11. The program product of claim 9 wherein the signal bearing media comprises transmission media.

12. A computer-implemented method for communication between a web browser and a persistent CGI program, the method including the steps of:

instantiating the persistent CGI program to create a first instance of the persistent CGI program;

establishing a non-continuous connection between the web browser and said first instance of the persistent CGI program;

sending a first web browser request to the persistent CGI program from the web browser via a web server;

using said first instance of the persistent CGI program to generate a result from the web browser request;

sending the result to the web browser;

using an identification mechanism to identify at least one resource-specific address from the web browser that will be accepted by said first instance of the persistent CGI program; and keeping said first instance of the persistent CGI program active, waiting for another request from the web browser, whereby said first instance of the persistent CGI program processes multiple discrete requests from the browser.

13. The computer-implemented method of claim 12 further comprising the step of terminating said first instance of the persistent CGI program after a pre-determined amount of time.

14. The computer-implemented method of claim 12 wherein the step of sending a first browser request to the persistent CGI program comprises the step of sending the first browser request to a process pool where the first browser request is assigned to said first instance of the persistent CGI program within the process pool.

15. The computer-implemented method of claim 14 further comprising the step of pre-initializing the persistent CGI program in the process pool to create an activation group.

* * * * *